US007870052B1

(12) United States Patent
Goldberg et al.

(10) Patent No.: US 7,870,052 B1
(45) Date of Patent: Jan. 11, 2011

(54) SYSTEM AND METHOD FOR FORECASTING PORTFOLIO LOSSES AT MULTIPLE HORIZONS

(75) Inventors: Lisa R. Goldberg, Kensington, CA (US); Guy Miller, San Francisco, CA (US); Jared Weinstein, San Francisco, CA (US)

(73) Assignee: Morgan Stanley Capital International, Inc., New York, NY (US)

( * ) Notice: Subject to any disclaimer, the term of this patent is extended or adjusted under 35 U.S.C. 154(b) by 906 days.

(21) Appl. No.: 11/789,318

(22) Filed: Apr. 24, 2007

(51) Int. Cl.
*G06Q 40/00* (2006.01)
(52) U.S. Cl. ............................ 705/36 R; 705/38
(58) Field of Classification Search ............... 705/35, 705/36 R, 4, 38; 370/315
See application file for complete search history.

(56) References Cited

U.S. PATENT DOCUMENTS

| | | | |
|---|---|---|---|
| 7,225,174 B2 | 5/2007 | Schreckengast et al. | |
| 7,698,213 B2 * | 4/2010 | Lancaster | 705/38 |
| 2003/0061152 A1 * | 3/2003 | De et al. | 705/38 |
| 2003/0149657 A1 | 8/2003 | Reynolds et al. | |
| 2003/0195831 A1 * | 10/2003 | Feldman | 705/36 |
| 2004/0054572 A1 | 3/2004 | Oldale et al. | |
| 2004/0225598 A1 | 11/2004 | Goldberg et al. | |
| 2005/0209959 A1 | 9/2005 | Tenney | |
| 2007/0043656 A1 * | 2/2007 | Lancaster | 705/38 |
| 2007/0180586 A1 * | 8/2007 | Amin | 977/755 |
| 2007/0244785 A1 * | 10/2007 | Williams | 705/36 R |
| 2008/0235222 A1 * | 9/2008 | Mojsilovic | 707/6 |

OTHER PUBLICATIONS

Anonymous "Insightful Expands Operations on Wall Street; Leading Analytics Provider Facilitates Continued Growth in Financial Services" Jun. 4, 2001 Business Wire.*
Anonymous "Products & services.(2005 guide to computerized trading)(Directory)" Jun. 15, 2005 Futures (Cedar Falls, Iowa), 34, 8, 44(33).*
Veres, Bob "Beyond the Pyramid: Think you know the state of the art in portfolio management? New research may offer some surprises-and suggest new approaches." Mar. 1, 2006 Financial Planning.*
Albanese et al. "A New Fourier Transform Algorithm for Value-At-Risk" Mar. 4, 2004, Institute of Physics Publishing, Quantitative Finance, vol. 4 (2004) 328-338.*
Goldberg et al. "Beyond Value at Risk: Forecasting Portfolio Loss at Multiple Horizons" 2008, Journal of Investment Management, vol. 6, No. 2, pp. 73-98.*
Murphy, Kevin, "A Brief Introduction to Graphical Models and Bayesian Networks", dated 1998, Webpage accessed from http://www.ai.mit.edu/~murphyk/Bayes/bayes.html, Nov. 1, 2004.

(Continued)

*Primary Examiner*—Kelly Campen
(74) *Attorney, Agent, or Firm*—K&L Gates LLP

(57) ABSTRACT

A computer system, which may comprise a processor, a memory and a database, may implement a loss surface determining software module that forecasts a portfolio's loss surface. Daily loss histories may be collected from actual data or may be generated using a factor model. A model may generate a sequence of iid high frequency loss innovations that can be temporally aggregated with a Fourier transform. For each portfolio, the loss surface may be forecasted and 95% and 99% value-at-risk and expected shortfall forecasts may be derived for various time horizons.

50 Claims, 3 Drawing Sheets

OTHER PUBLICATIONS

Li, David X., "On Default Correlation: A Copula Function Approach", dated Apr. 2000, Webpage accessed from http://defaultrisk.com/pp_corr_05.htm, Mar. 4, 2005.

Hull, John, and White, Alan, "The Valuation of Credit Default Swap Options", dated Jan. 2003, Webpage accessed from http://defaultrisk.com/pp_crdrv_27.htm, Mar. 4, 2005.

"Bayes's Theorem", dated Jun. 28, 2003, Webpage accessed from http://plato.stanford.edu/entries/bayes-theorem, Sep. 22, 2003.

Garcia, Joao; Gielens, Geert; Leonard, Luc; and Van Gestel, Tony, "Pricing Baskets Using Gaussian Copula and BET Methodology: a Market Test", dated Jun. 23, 2003, Webpage accessed from http://defaultrisk.com/pp_crdrv_35.htm, Mar. 4, 2005.

Yu, Fan, "Correlated Defaults and the Valuation of Defaultable Securities", dated May 2004, Webpage accessed from http://www.moodyskmv.com/conf04/pdfpresentations/yu_corr_def_and_val.pdf, Feb. 24, 2005.

Giesecke, Kay and Goldberg, Lisa R., "The Market Price of Credit Risk", dated Sep. 23, 2003, revised Sep. 23, 2004.

Giesecke, Kay, "Credit Risk Modeling and Valuation: An Introduction", dated Oct. 24, 2004, Webpage accessed from http://defaultrisk.com/pp_model_38.htm, Mar. 4, 2005.

Malevergne, Yannick and Somette, Didier, "Testing the Gaussian Copula Hypothesis for Financial Assets Dependencies", Webpage accessed from http://www.papers.ssrn.com/sol3/papers.cfm?abstract_id=291140I, Mar. 7, 2005.

Merton, "On the Pricing of Corporate Debt: The Risk Structure of Interest Rates", Journal of Finance, 29:449-470 (1974).

Black et al., "Valuing Corporate Securities: Some Effects of Bond Indenture Provisions", Journal of Finance, 31:351-367 (1976).

Longstaff et al., "A Simple Approach to Valuing Risky Fixed and Floating Rate Debt", Journal of Finance, 50(3):789-819 (1995).

Leland, "Corporate Debt Value, Bond Covenants and Optimal Capital Structure", Journal of Finance, 49(4):1213-1252 (1994).

Giesecke et al., "Forecasting Default in the Face of Uncertainty", Journal of Derivatives, 12(1):1-15 (2004).

Eom et al., "Structural Models of Corporate Bond Pricing: An Empirical Analysis", Review of Financial Studies, 17:499-544 (2004).

U.S. Appl. No. 11/825,718, filed Jul. 9, 2007.
U.S. Appl. No. 11/355,160, filed Feb. 14, 2006.
U.S. Appl. No. 11/581,501, filed Oct. 16, 2006.
U.S. Appl. No. 10/994,832, filed Nov. 22, 2004.
Office Action issued on Mar. 24, 2008 in U.S. Appl. No. 10/994,832.
Office Action issued on Dec. 15, 2008 in U.S. Appl. No. 10/994,832.

Bertsimas, D., Lauprete, G.J. and A. Samarov, "Shortfall as a Risk Measure: Properties, Optimization and Application." *Journal of Economic Dynamic & Control*, 28, (2004), 1353-1381.

Danielsson, J., de Hann, L., Peng, L., and C. G. de Vries. "Using a Bootstrap Method to Choose the Sample Fraction in Tail Index Estimation." Econometric Institute Report EI 2000-19/A.

Duffy, D. and J. Pan. "An Overview of Value at Risk." *The Journal of Derivatives*, Spring 1997.

Fernandex, V. "Extreme Value Theory and Value at Risk." *Revista de Análisis Económico*. vol. 18, No. 1, pp. 57-83, 2003.

Heyde, C. C. and S. G. Kou. "On the Controversy Over Tailweight of Distributions." *Operations Research Letters* 32 (2004), pp. 399-408.

McNeil, A. and Frey, R., (2000). "Estimation of Tail—Related Risk Masures for Heteroscedastic Financial Times Series: an Extreme Value Approach." *Journal of Empirical Finance*, 7 (3-4), pp. 371-300.

Niederhausen, H. "Scheffer Polynomials for Computing Exact Kolomogrov-Smirnov and Rényi Type Distributions." *The Annals of Statistics*, vol. 9, No. 5 (1981), pp. 923-944.

Chakravart, Laha, and Roy (1967). *Handbook of Methods of Applied Statistics*, vol. I, John Wiley and Sons, pp. 392-394, Chapter 8.

* cited by examiner

SYSTEM AND METHOD FOR FORECASTING PORTFOLIO LOSSES AT MULTIPLE HORIZONS

BACKGROUND

Portfolio risk refers to a wide range of threats to the financial well-being of an investment portfolio. Accordingly, the field of portfolio risk management includes diverse functions such as portfolio optimization and capital allocation, and it relies on a broad and complex set of quantitative measures. One of the most important of these is volatility, which is the standard deviation of loss or return of the portfolio. Volatility plays a significant role in every aspect of risk management. However, it is well known that volatility does not give a complete picture of financial risk. For example, it does not properly describe the extreme events that are prevalent in financial markets and it provides no insight into the temporal aspects of risk.

Volatility forecasts are often supplemented with estimates of value-at-risk (VaR), which is the pth quantile of the loss distribution for a specified confidence level p. Since the value of p can be varied, VaR measures risk that is not included in volatility estimates. However, neither VaR nor volatility forecasts the risk of severe loss, which is difficult to measure precisely due to intrinsic data constraints. A crude estimator of severe loss is expected shortfall (ES), which is the average excess loss given that the VaR limit is breached.

In principle, volatility, value-at-risk, expected shortfall, and all other quantitative measures of portfolio risk can be derived from the loss surface, which is the set of portfolio loss distributions at a number of time horizons. Thus, the loss surface has the conceptual virtue of providing a common perspective on different facets of portfolio risk. However, there are many practical difficulties involved in its estimation.

SUMMARY OF THE INVENTION

In one general aspect, the present invention is directed to a computer system that estimates the loss surface of an investment portfolio. According to various embodiments, the computer system may comprise a processor, a memory and a database. The memory may comprise software which when executed by the processor causes the processor to estimate the loss surface according to a process that involves extracting an iid (independent and identically distributed) series of loss innovations from a history of daily losses. The history of daily losses may be stored in the database. A semiparametric model of the loss innovations may then be estimated using, for example, a Peaks Over Threshold (POT) algorithm. Then, the loss distribution functions $F^T_t$ for a horizon of T days, where $T \geq 1$ (which corresponds to the loss surface), may be determined based on the semiparametric model using a Fourier transform. The loss distribution functions $F^T_t$ may then be scaled by an estimate of the current volatility of the portfolio.

A potential challenge may be that relevant data histories may be inadequate to give reliable risk forecasts, especially at long horizons or for extreme events. This challenge may be approached in multiple ways. High frequency (or short horizon) data may be used to forecast risk at all horizons. This may be possible since loss over a longer horizon can be expressed as a sum of shorter horizon losses. However, the summands may be neither independent nor identically distributed, so the statistical relationship of the parts to the whole may be complicated. This relationship may be modeled in a rudimentary way by adjusting for serial correlation and variable volatility. Adjusting the data for this relationship, the model may generate a sequence of iid high frequency loss innovations that can be temporally aggregated with a Fourier transform. When high frequency loss data are insufficient, the data shortage may be confronted by using a factor model to create a meaningful proxy or forecasted history of portfolio losses. This may work especially well for equity portfolios, where risk factors may be relatively standard and long factor return histories may be available in many markets.

The Peaks-Over-Thresholds (POT) semi-parametric procedure used to estimate the semi-parametric model of the loss innovations may use historical data to specify the distribution core and extreme observations to fit the distribution tails. According to various embodiments, it may not rely on a priori assumptions about distributional symmetry or tail weight. The fit may be tailored to the data. There may be no prescribed way to decide how many data points comprise the tail, or equivalently, where to put the thresholds that divide the distribution core from the tails. The decision may be automated with a Kuiper statistic, which is a non-parametric measure that is used to assess the tail fit. Risk forecasts may be tested out-of-sample on a diverse collection of portfolios including equity indices, fixed income indices, an emerging market index, a long/short equity portfolio, and a currency index. For each portfolio, the loss surface may be forecasted and 95% and 99% value-at-risk and expected shortfall forecasts may be derived for various time horizons. A typical time horizon may be 10 days. The results may compare favorably to market standard forecasts.

Other aspects of the present invention are directed to related computer-assisted methods and computer readable media.

FIGURES

Embodiments of the present invention are described herein by way of example in conjunction with the following figures, wherein.

DETAILED DESCRIPTION OF THE INVENTION

Figure 1:
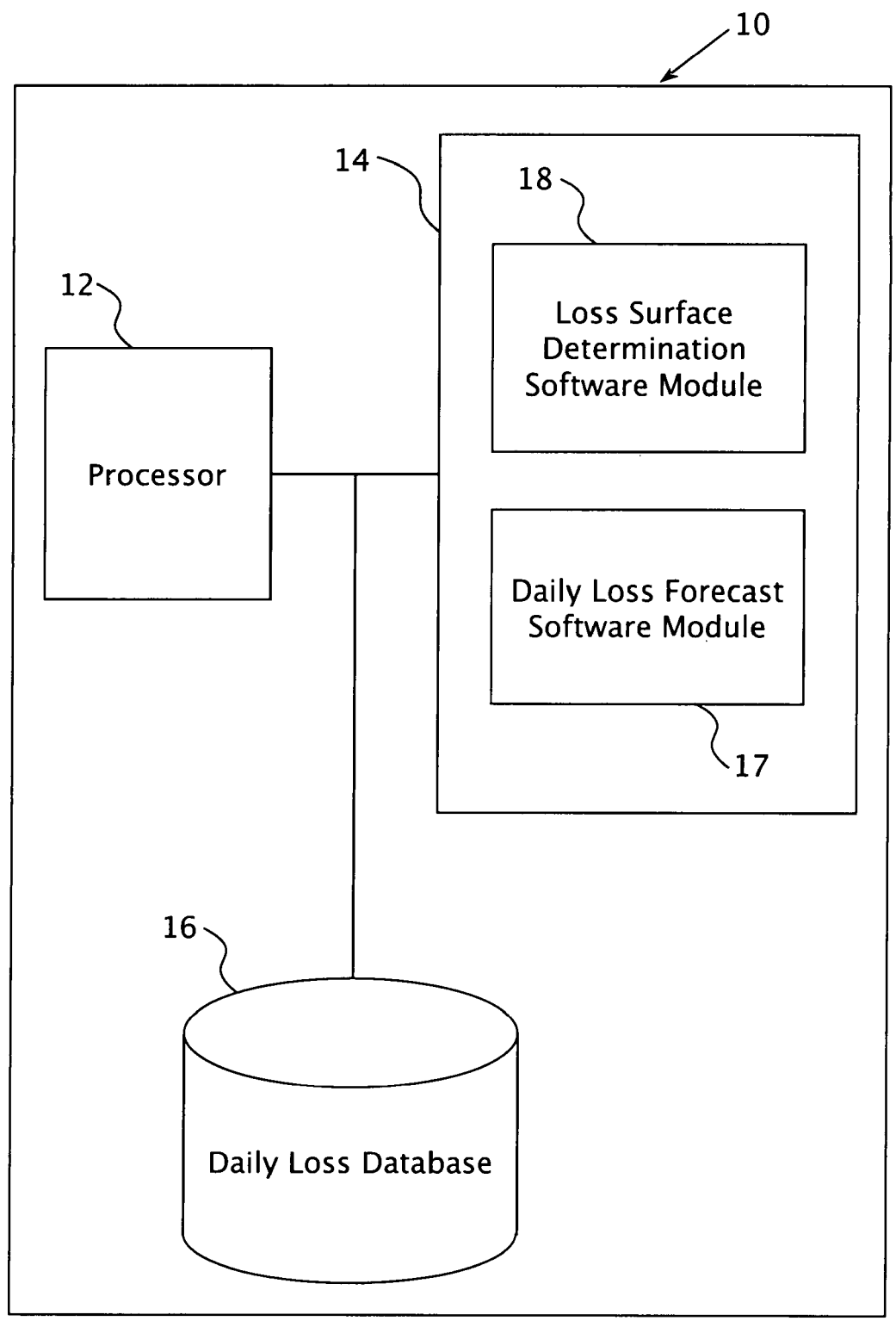
FIG. 1 depicts a computer system according to one embodiment of the present invention.

As shown in FIG. 1, one embodiment of the present invention may comprise a computer system 10 that estimates the loss surface of an investment portfolio. The computer system may comprise one or more processors 12 in communication with a memory 14 and a database 16 storing daily losses (either actual or forecasted) of the portfolio. The memory 14 may comprise a loss surface determination software module 18 and a daily loss forecast software module 17. When the processor 12 executes the code of the loss surface determination software module 18, the processor 12 may be caused to determine (or estimate) the loss surface for the investment portfolio as described further below. When the processor 12 executes the code of the daily loss forecast software module 17, the processor 12 may be caused to forecast daily losses for the portfolio as described further below. The forecasted daily loss data may be stored in the database 16. This feature may be used when there are not sufficient actual daily loss data for the portfolio to estimate the loss surface. In circumstances where there is sufficient actual daily loss data, that data may be stored in the database 16.

The computer system 10 may be a personal computer, a laptop, a mainframe computer, a server, a workstation, or any other suitable computing device. The memory 14 may be any suitable type of computer-readable medium, such as, for example, random access memory (RAM), read-only memory (ROM), a magnetic medium, such as a hard drive or floppy disk, or an optical medium, such as a CD-ROM. The modules 17, 18 may be implemented as software code to be executed by the processor(s) 12 using any suitable computer language. The software code may be stored as a series of instructions or commands in the memory 14.

In one embodiment, $L^T_t$ may equal the portfolio loss on day t over a horizon of T days. The time t loss surface may be represented as a series of cumulative distribution functions $F^T_t$ for $T \geq 1$. Here $F^T_t$ may be the distribution of losses $L^T_t$ over a horizon of T days. Value-at-risk (VaR) and expected shortfall (ES) may be calculated from $F^T_t$, as is known in the art.

Figure 2:
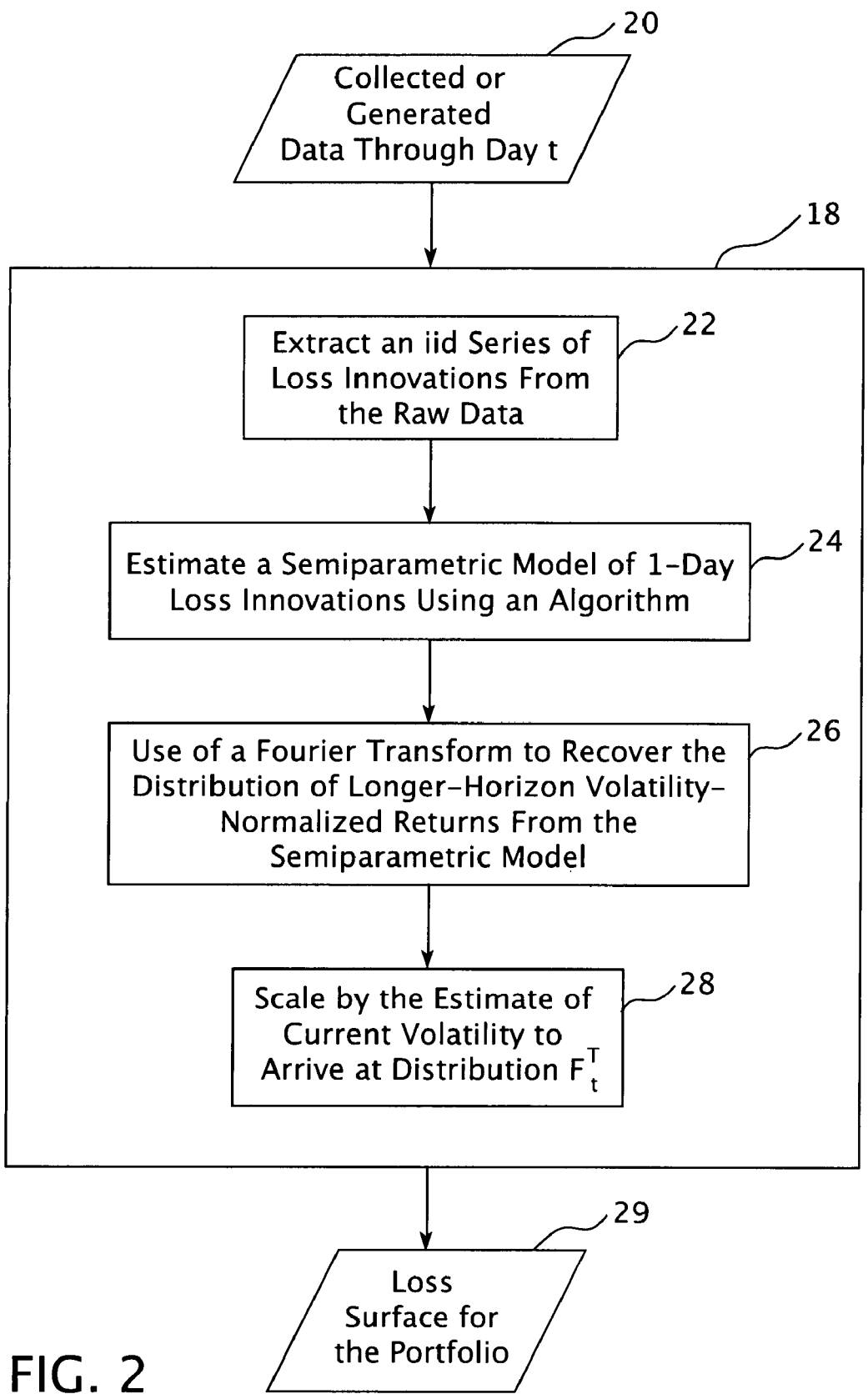
FIG. 2 is a flowchart illustrating the steps taken in determining the loss surface of a portfolio in one embodiment of the present invention.

FIG. 2 is a diagram of the process flow of the loss surface determination software module 18 according to one embodiment. At step 20, the history of daily losses may be provided to allow the calculation to be performed. This data may be stored in the daily loss database 16.

Figure 3:
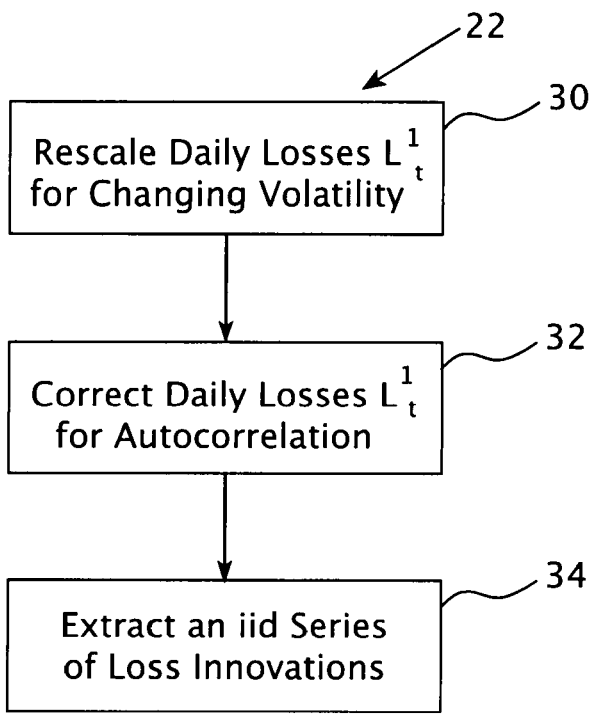
FIG. 3 is a flowchart illustrating the steps taken in extracting an iid series of loss innovations in one embodiment of the present invention.

After receiving the history of daily losses, a series of independent identically distributed (iid) loss innovations, or loss data, at step 22, may be extracted from the raw data. FIG. 3 is a diagram of the process flow for extracting the series of iid loss innovations. At steps 30 and 32, the daily losses may be corrected for heteroscedasticity and serial autocorrelation. At step 34, an iid series of loss innovations may be extracted from a history of daily losses $L^1_t$ by rescaling for changing volatility, at step 30, and by correcting for autocorrelation, at step 32. The history of daily losses may be expressed as:

$$L^T_t = L_t + L_{t+1} + \ldots + L_{t+T-1}$$

(When T=1, the superscript may have been supressed).

In one embodiment, $L_t$ may follow a stochastic process with varying volatility $\sigma_t$. An estimate of $\sigma_t$ may be an exponentially-weighted moving average determined by the recursion $$\hat{\sigma}^2_t = \lambda \hat{\sigma}^2_{t-1} + (1-\lambda)(L_{t-1})^2 \text{ with an initial value of } \hat{\sigma}_1 = |L_1|.$$

For example, may be set to equal 0.94, so that the influence of losses has a half life of about eleven (11) days, and then $\tilde{L}^T_t = L_t / \hat{\sigma}_t$ may be assumed to be a sequence of draws from a single loss distribution with variance 1.

At step 32, to correct for autocorrelation in volatility-rescaled losses, an autoregression model may be used under which each day's volatility-rescaled loss may be an echo of the previous day's loss together with a loss innovation $\epsilon_t$ such that:

$$\tilde{L}_t = \kappa \tilde{L}_{t-1} + \epsilon_t$$

Recursively applying the above equation and summing gives the following equation:

$$\tilde{L}^T_t = \frac{\kappa^{T+1} - \kappa}{\kappa - 1} \tilde{L}_{t-1} + \frac{\kappa^T - 1}{\kappa - 1} \epsilon_t \ldots + \epsilon_{t+T-1}$$

in which the volatility-rescaled T-day loss on day t may be expressed in terms of the loss on day (t−1) and on T consecutive loss innovations. If the volatility stays fixed between days t and (t+T+1), $L^T_t$ may be represented by:

$$L^T_t \approx \sum_{\kappa=0}^{T-1} \sigma_t \tilde{L}_{t+\kappa} = \sigma_t \tilde{L}^T_t$$

In one embodiment, to estimate risk on day t for a horizon of T days, a Peaks Over Threshold (POT) method may be used along with the necessary variables which may include the coefficient κ, the current volatility estimate $\tilde{\sigma}_t$, the previous day's losses $\tilde{L}_{t-1}$ and the (common) distribution of the loss innovations $\epsilon_t, \ldots, \epsilon_{t+T-1}$.

Figure 4:
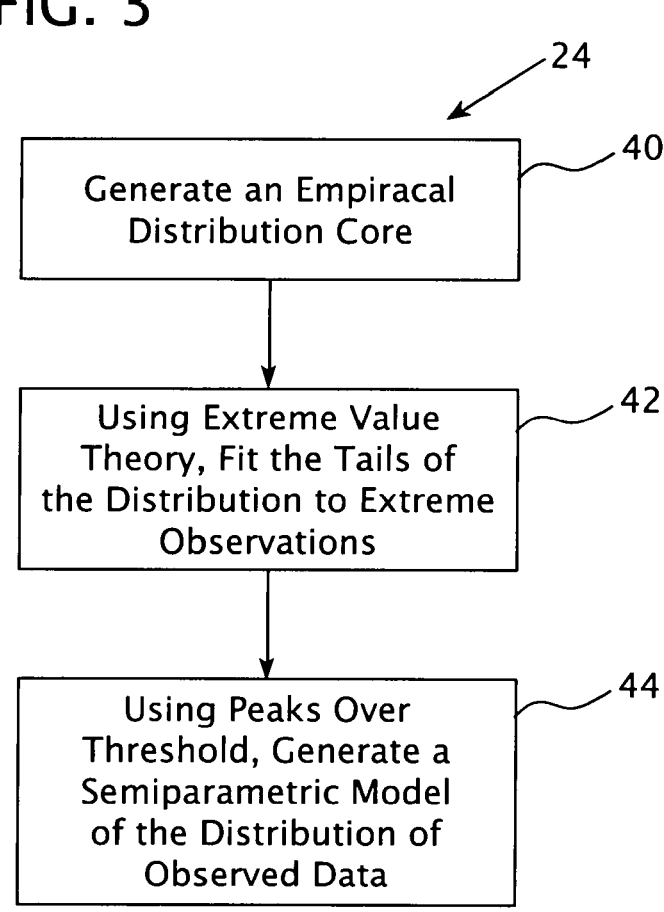
FIG. 4 is a flowchart illustrating the steps taken in estimating the semiparametric model in one embodiment of the present invention.

At step 24 (see FIG. 2), a semiparametric model of a period of loss innovations may be estimated using an algorithm such as POT. FIG. 4 is a flow chart showing the process for step 24 according to various embodiments. This semiparametric model may take account of the correction for serial autocorrelation. The period of loss innovations may be one day. The POT algorithm may be used to generate an estimate of the tail of a distribution from a sequence of iid draws. At step 40, a distribution core may be generated which may be empirical. At step 42, the tails of the distribution may be fitted to the distribution of extreme observations using extreme value theory. Using an algorithm, which may be POT, a semiparametric model of the distribution of the observed data may be generated, at step 44.

For example, consider the sequence of iid loss innovations $\epsilon_1, \epsilon_2, \ldots$ with cumulative distribution function F. Extreme value theory may concern the limit of the sequence of records $$M_n = \max\{\epsilon_1, \ldots, \epsilon_n\} \text{ as } n \to \infty$$

Under technical assumptions on F, it may be possible to find forming constants $c_n > 0$ and $d_n$ and a limiting distribution H so that $$\frac{M_n - d_n}{c_n} \to H$$

where the convergence may be in distribution. The Fischer-Tippet theorem asserts that the limiting distribution H is unique up to affine rescaling. When the normalized records of F converge to a limit H, F may be in the domain of attraction of H.

The limiting extreme value distributions may comprise a one-parameter family $H_\xi$ with cumulative distribution functions $$H_\xi(x) = \exp\left(-(1+\xi x)^{-\frac{1}{\xi}}\right).$$

It may be understood that the distribution defined by H has support on the interval on which $1+\xi x>0$ for $\xi \neq 0$, and when $\xi=0$, $H_0$ may be defined as the limit $$H_0(x) = \lim_{\xi \to 0} H_\xi(x) = \exp(-e^{-x})$$

For example, in the cases $\xi>0$, $\xi<0$, and $\xi=0$, the distribution H is respectively known as the Frechet, Gumbel, and Weibell distribution. The parameter $$\alpha = \frac{1}{\xi}$$

may be the tail index.

The thrust of the POT method lies in the observation that distributions in the maximal domain of attraction to one of the $H_\xi$ may exhibit asymptotic tail behavior that can be explicitly described. Some notation may be required to explain this. For example, F may be the cumulative distribution function of a random variable $\epsilon$, and $F_u$ may denote the distribution of excesses over a threshold u:

$$F_u(x) = P(\epsilon - u | \epsilon > u)$$

A basic result of extreme value theory may be shown by the following theorem:

Let $\epsilon$ be a random variable with right endpoint $\epsilon_{max}$. The following are equivalent:

(1) The variable $\epsilon$ is in the maximal domain of attraction of $H_\xi$.
(2) There exists a positive measurable function a(u) such that $$\lim_{u \to x_{max}^+} P\left(\frac{\epsilon - u}{a(u)} \langle x | \epsilon \rangle u\right) = \begin{cases} 1 - (1 + \xi x)^{-\frac{1}{\xi}} & \text{if } \xi \neq 0 \\ 1 - e^{-x} & \text{if } \xi = 0 \end{cases}$$

(3) If $G_\xi$ is the distribution described by the right hand side of (2) and if $G_{\xi,\beta}$ is the rescaled distribution with $$G_{\xi,\beta} = G_\xi(x/\beta),$$

then $$\lim_{x \to x_{max}} \sup_{0 < x < x_{max}^-u} |F_u(x) - G_{\xi, \beta(u)}(x)| = 0$$

for some positive function $\beta$.

$G_{\xi,\beta}$ may be generalized Pareto distributions (GPD).

For a particular threshold u, there may be optional estimators $\hat{\alpha}$ and $\hat{\beta}$ that may be able to be found by means of maximum likelihood estimation. If the threshold u is too small, the tail parameter estimators $\hat{\alpha}$ and $\hat{\beta}$ may be biased by the data in the core of the distribution. If the threshold u is too large, the small number of data points exceeding u may produce high variance estimators. This bias-variance tradeoff may be resolved by setting the threshold to a value that uses as much data as possible to generate a statistically acceptable fit of the tail to a GPD. In the preferred embodiment, the fit may be measured with a Kuiper statistic. In other embodiments, the fit may be measured using a Kolomogorov-Smirnov statistic or some other statistic known to one skilled in the art.

In one embodiment, if $F_N$ is the empirical distribution function of observations for a given distribution, F may define $$D^\pm(F_N, F) = \max(\pm(F_N(x) - F(x)), 0)$$

and the Kuiper statistic may be $$\kappa(F_N, F) = D^+ + D^-$$

If the observations follow F, then $\kappa(F_N, F)$ may follow a distribution depending only on N and not on F. $K_N$ may be a cumulative distribution function for $K(F_N, F)$. $K_N$ may be quickly generated to arbitrary precision for any N using Monte Carlo simulation of draws from any F.

The Kuiper statistic may be used to evaluate POT fits corresponding to different thresholds. For each u in a sequence of candidate thresholds, the fit of the optimal GPD $F_u$ to the $N_u$ loss innovations that exceed u may be tested. An optimal threshold $\hat{u}$ may be chosen to be the smallest value for which the fit is acceptable at the 95% confidence level. For example:

$$\hat{u} = \inf\{u | K_{N_u}(\kappa(F_{N_u}, F_u)) < 0.95\}$$

Candidate thresholds may be chosen so that $N_u = 25, 50, 75$, etc. The distribution of the Kuiper statistic may be computed only once for these values of N and stored for future use.

As shown in step 26 of FIG. 2, a Fourier transform may be used to recover the distribution of longer-horizon volatility-normalized returns from the semiparametric model. In one embodiment, assuming that loss innovations are independent, the loss innovations may be temporally aggregated using the Fourier transform. The loss distribution function $F_t^T$ may be determined for a horizon of T days, where T is greater than, or equal to, one day. T may equal 10 days, 90 days or any other appropriate or preferred number of days. Also, in various embodiments, $F_t^T$ could be computed for just one value of T, or it could be computed for a number of different values of T. The loss surface for horizons beginning on day t given loss data for all previous days may be computed in the following manner:

$$\tilde{L}_t^T - \frac{\kappa^{T+1} - \kappa}{\kappa - 1} \tilde{L}_{t-1} = \frac{\kappa^T - 1}{\kappa - 1} \varepsilon_t + \frac{\kappa^{T-1} - 1}{\kappa - 1} \varepsilon_{t+1} \ldots + \varepsilon_{t+T-1}$$

The common distribution of the $\epsilon_{t+\kappa}$ may have a Fourier transform $\phi_\epsilon(s)$. The distribution $$\tilde{L}_t^T - \frac{\kappa^{T+1} - \kappa}{\kappa - 1} \tilde{L}_{t-1}$$

may have a Fourier transform:

$$\prod_{k=1}^{T} \phi_\varepsilon\left(\frac{\kappa^k - 1}{\kappa - 1} s\right)$$

Applying the inverse transform and adding the (known) value of $$\frac{\kappa^{T+1} - \kappa}{\kappa - 1} \tilde{L}_{t-1}$$

may give the model distribution of $\tilde{F}_T$ of $\tilde{L}_t^T$.

As shown in step 28 of FIG. 2, scaling by the estimate of current volatility a may yield a distribution $F_t^T$ of losses $L_t^T$, or in other words, $F_t^T$ may be the distribution of the loss surface of the portfolio. For example, in practice, κ may be near enough to 0 that terms in $\kappa^2$ can be safely discarded resulting in a simplified expression:

$$\phi_\epsilon(s)\phi_\epsilon((1\kappa)s)^{T-1}$$

For example, this model may be used to construct probability distributions for returns to the S&P 500 at every time horizon. The $VaR_{p,t}^T$ may be the pth quantile of $F_t^T$, and $ES_p^T$ may be the average excess beyond that quantile. The loss distribution function $F_t^T$, the VaR, and/or the ES may be stored in the daily loss database 16, some other database, or a file. Also, the loss distribution function $F_t^T$, VaR, and/or ES may also be transmitted using a network or some other similar method of data communication ("not shown").

There may be instances where the actual data collected in step 20 may be insufficient to perform reliable calculations. Extreme value techniques such as POT estimation may be data intensive and it may be a difficulty that the return history of a particular portfolio is too short. In these instances, pseudo or forecasted daily loss histories may be generated at step 20 to provide enough data points for reliable calculations using the daily loss forecast software module 17. In these instances, a factor model may be used to create a proxy history of sufficient size. The factor model may be used to calculate daily loss histories for a portfolio of securities (e.g., stocks, bonds, etc.), derivative instruments (e.g., put options, call options, forward contracts, etc.) or a combination of the two. The factor model may use a historical factor series to forecast the daily losses. For example, in a preferred embodiment, the factor model may use the MSCI Barra Factor Series. There may be disagreement between the time horizon of the input data for the factor model and the time horizon over which the daily losses are forecasted so long as there is a sufficiently high frequency data set for the input data.

In a preferred embodiment, the factor model may be:

$$L_t = XF_t + S_t$$

where $F_t$ may be a vector of market factor returns (e.g., the entire market, or a collection of industry and/or style factors), $S_t$ may be returns specific to the portfolio assets, and X may be a vector whose components are the exposure of the portfolio to the factors. The model may assume that the factor returns $F_t$ and the specific returns $S_t$ may be independent, and that asset specific returns may be diversifiable. Under the assumption that asset specific returns may be diversifiable, the central limit theorem may imply that $S_t$ may be approximately normally distributed with a standard deviation that can be estimated from the data. The approach may be to then model the distribution of $\beta F_t$ and convolve that distribution with the normal forecast for the specific return using the Fourier transform. This may be accomplished with the method previously disclosed.

In a preferred embodiment, the VaR and ES for the portfolio may be calculated from the calculated distribution of loss surface. The portfolio loss $L_t^T$ may be represented by the following equation:

$$L_t^T = -\log\left(\frac{P_{t+T}}{P_t}\right)$$

where $P_t$ may be the time t value of the portfolio. However, for long/short portfolios, portfolios of options, and other highly leveraged portfolios, $L_t^T$ may be represented by the following equation:

$$L_t^T = P_t - P_{t+T}$$

The VaR on day t over horizon T with confidence level p may be the p-quantile of $L_t^T$:

$$P(L_t^T < VaR_{p,t}^T) = p$$

The ES of $L_t^T$ may be the expected loss of $L_t^T$ given that the VaR threshold may be breached:

$$ES_{p,t}^T = E(L^T - VaR_{p,t}^T | L^T > VaR_{p,t}^T)$$

If $L_t^T$ follows a distribution with cumulative distribution function $F_t^T$, then VaR may be expressed as $$VaR_{p,t}^T = (F_t^T)^{-1}(p)$$

and ES may be expressed as $$ES_p^T = \frac{1}{1-p} \int_{VaR_{p,t}^T}^{\infty} (x - VaR_{p,t}^T) \, dF_t^T(x)$$

For example, suppose losses are normally distributed with mean 0 and variance σ and let Φ denote the cumulative distribution function of the standard normal:

$$\Phi(x) = \frac{1}{\sqrt{2\pi}} \int_{\infty}^{x} \exp\left(-\frac{u^2}{2}\right) du$$

Then $$VaR_p = \sigma \Phi^{-1}(p) \text{ and}$$

$$ES_p = \left(\frac{\exp(-(\Phi^{-1}(p))^2/2)}{\sqrt{2\pi}(1-p)\Phi^{-1}(p)} - 1\right) VaR_p$$

In another example, suppose the losses follow an exponential distribution with parameter λ so that the density function is $\lambda \exp(-\lambda x)$, then $$VaR_p = \frac{1}{\lambda} \log \frac{1}{1-p} \text{ and}$$

$$ES_p = \frac{1}{\log(1/1-p)} VaR_p$$

In an additional example, suppose losses beyond a certain threshold follow a power law, so that the probability that $L^T > x$ is asymptotic to $x^{-\alpha}$ for some $\alpha > 0$, then $$VaR_p = (1-p)^{-1/\alpha} \text{ and}$$

$$ES_p = \begin{cases} \dfrac{1}{\alpha-1} VaR_p & \text{for } \alpha > 1 \text{ and for } p \text{ large enough} \\ \infty & \text{for } 0 < \alpha \leq 1 \end{cases}$$

In one embodiment, upon calculation of the VaR, or some other parameter derived from the loss surface, for the portfolio, the VaR (or the other parameter) may be reported to a regulatory agency by a portfolio manager or some other manager associated with the portfolio. Undertakings for Collective Investments in Transferrable Securities, or UCITS, are a set of European Union regulations that may require ten (10) day VaR to be reported to a regulatory agency. Banking regulations may also require VaR to be reported. In another embodiment, the ES may be reported to a regulatory agency.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer readable medium having instructions stored thereon which, when executed by a processor, cause the processor to estimate a loss surface of a portfolio by:
    extracting an independent identically distributed series of loss innovations from a history of daily losses;
    estimating a semiparametric model of the loss innovations;
    determining one or more loss distribution functions $F_t^T$ for a horizon of T days, when $T \geq 1$, based on the semiparametric model using a Fourier transform; and
    scaling the one or more loss distribution functions $F_t^T$ by an estimate of current volatility.

2. The computer readable medium of claim 1, wherein determining the one or more loss distribution functions $F_t^T$ comprises determining the loss distribution functions $F_t^T$ for at least two different values of T.

3. The computer readable medium of claim 1, wherein the history of daily losses comprises actual daily losses.

4. The computer readable medium of claim 3, wherein the history of daily losses comprises forecasted daily losses.

5. The computer readable medium of claim 4, having further stored thereon instructions, which when executed by the processor, cause the processor to generate the forecasted daily losses using a factor model.

6. The computer readable medium of claim 5, wherein the history of daily losses comprises the daily losses up to time t.

7. The computer readable medium of claim 1, having further stored thereon instructions, which when executed by the processor, cause the processor to correct the daily losses for heteroscedasticity.

8. The computer readable medium of claim 7, having further stored thereon instructions, which when executed by the processor, cause the processor to correct the daily losses for serial autocorrelation, and to take account of the daily loss correction for serial autocorrelation when estimating the semiparametric model.

9. The computer readable medium of claim 1, having further stored thereon instructions, which when executed by the processor, cause the processor to correct the daily losses for heteroscedasticity and serial autocorrelation, and to take account of the daily loss correction for serial autocorrelation when estimating the semiparametric model.

10. The computer readable medium of claim 1, wherein estimating the semiparametric model comprises estimating 1 day loss innovations.

11. The computer readable medium of claim 1, wherein estimating the semiparametric model comprises using a Peaks Over Threshold algorithm.

12. The computer readable medium of claim 1, wherein one of the values for T equals 10 days.

13. The computer readable medium of claim 1, wherein one of the values for T equals 90 days.

14. A method comprising:
    computing a loss surface of a portfolio by:
        extracting, by a computer system, an independent identically distributed series of loss innovations from a history of daily losses, wherein the computer system comprises a processor and a memory in communication with the processor;
        estimating, by the computer system, a semiparametric model of the loss innovations;
        determining, by the computer system, one or more loss distribution functions $F_t^T$ for a horizon of T days, when $T \geq 1$, based on the semiparametric model using a Fourier transform; and
        scaling, by the computer system, the one or more loss distribution functions $F_t^T$ by an estimate of current volatility; and
    storing the one or more loss distribution functions $F_t^T$.

15. The method of claim 14, wherein determining the one or more loss distribution functions $F_t^T$ comprises determining the loss distribution functions $F_t^T$ for at least two different values of T.

16. The method of claim 14, further comprising calculating a parameter based on the determination of loss surface.

17. The method of claim 16, further comprising reporting the parameter to a regulatory agency.

18. The method of claim 16, wherein the parameter is Value-at-Risk.

19. The method of claim 16, wherein the parameter is the expected shortfall for the portfolio.

20. The method of claim 14, wherein the history of daily losses comprises actual daily losses.

21. The method of claim 20, wherein the history of daily losses comprises forecasted daily losses.

22. The method of claim 21, further comprising generating the forecasted daily losses using a factor model.

23. The method of claim 22, wherein the history of daily losses comprises the daily losses up to time t.

24. The method of claim 14, further comprising correcting the daily losses for heteroscedasticity.

25. The method of claim 14, further comprising correcting the daily losses for serial autocorrelation, and wherein estimating the semiparametric model comprises estimating the semiparametric model by taking into account of correction for serial autocorrelation.

26. The method of claim 14, further comprising correcting the daily losses for heteroscedasticity and serial autocorrelation, and wherein estimating the semiparametric model comprises estimating the semiparametric model by taking into account of correction for serial autocorrelation.

27. The method of claim 14, wherein the estimate of the semiparametric model comprises an estimate of 1 day loss innovations.

28. The method of claim 14, wherein estimating the semiparametric model comprises estimating the semiparametric model using a Peaks Over Threshold algorithm.

29. A system for computing a loss surface of a portfolio comprising:
a processor; and
a memory in communication with the processor, wherein the memory stores instructions which when executed by the processor causes the processor to estimate a loss surface of a portfolio by:
extracting an independent identically distributed series of loss innovations from a history of daily losses;
estimating a semiparametric model of the loss innovations;
determining one or more loss distribution functions $F^T_t$ for a horizon of T days, when $T \geq 1$, based on the semiparametric model using a Fourier transform; and
scaling the one or more loss distribution functions $F^T_t$ by an estimate of current volatility.

30. The system of claim 29, wherein determining the one or more loss distribution functions $F^T_t$ comprises determining the loss distribution functions $F^T_t$ for at least two different values of T.

31. The system of claim 29, wherein the history of daily losses comprises actual daily losses.

32. The system of claim 31, wherein the history of daily losses comprises forecasted daily losses.

33. The system of claim 32, wherein the history of forecasted daily losses are generated using a factor model.

34. The system of claim 33, wherein the history of daily losses comprises the daily losses up to time t.

35. The system of claim 29, wherein the daily losses are corrected for heteroscedasticity.

36. The system of claim 29, wherein the daily losses are corrected for serial autocorrelation, and wherein the semiparametric model takes account of the correction.

37. The system of claim 29, wherein the daily losses are corrected for heteroscedasticity and serial autocorrelation, and wherein the semiparametric model takes account of the correction for serial autocorrelation.

38. The system of claim 29, wherein the estimate of the semiparametric model comprises an estimate of 1 day loss innovations.

39. The system of claim 29, wherein the estimate of the semiparametric model uses a Peaks Over Threshold algorithm.

40. A system for computing a loss surface of a portfolio comprising:
a processor; and
a database in communication with the processor, wherein the database stores a history of daily losses for the portfolio, and wherein the processor is programmed to estimate a loss surface of the portfolio by:
extracting an independent identically distributed series of loss innovations from the history of daily losses;
estimating a semiparametric model of the loss innovations;
determining one or more loss distribution functions $F^T_t$ for a horizon of T days, when $T \geq 1$, based on the semiparametric model using a Fourier transform; and
scaling the one or more loss distribution functions $F^T_t$ by an estimate of current volatility.

41. The system of claim 40, wherein determining the one or more loss distribution functions $F^T_t$ comprises determining the loss distribution functions $F^T_t$ for at least two different values of T.

42. The system of claim 40, wherein the history of daily losses comprises actual daily losses.

43. The system of claim 42, wherein the history of daily losses comprises forecasted daily losses.

44. The system of claim 43, wherein the history of forecasted daily losses are generated using a factor model.

45. The system of claim 44, wherein the history of daily losses comprise the daily losses up to time t.

46. The system of claim 40, wherein the daily losses are corrected for heteroscedasticity.

47. The system of claim 40, wherein the daily losses are corrected for serial autocorrelation, and wherein the semiparametric model takes account of the correction.

48. The system of claim 40, wherein the daily losses are corrected for heteroscedasticity and serial autocorrelation, and wherein the semiparametric model takes account of the correction for serial autocorrelation.

49. The system of claim 40, wherein the estimate of the semiparametric model comprises an estimate of 1 day loss innovations.

50. The system of claim 40, wherein the estimate of the semiparametric model uses a Peaks Over Threshold algorithm.

* * * * *